(No Model.) 2 Sheets—Sheet 1.
C. W. COTTON, W. C. MARGEDANT, J. T. GARDNER,
& A. W. G. MARGEDANT.
SPOKE FACING MACHINE.
No. 439,053. Patented Oct. 21, 1890.
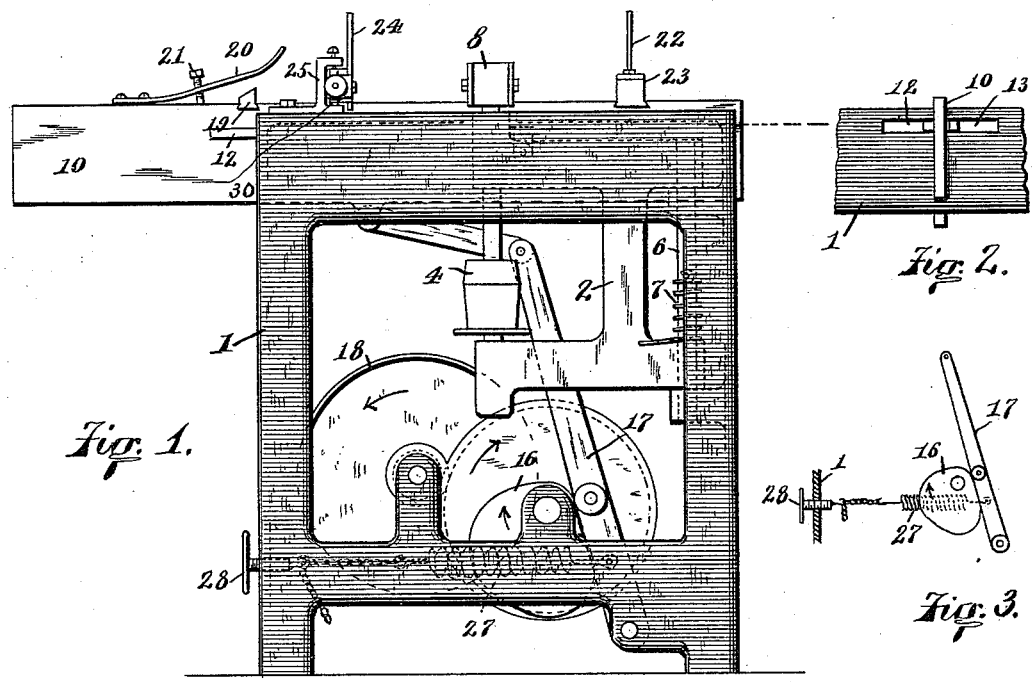
Fig. 1.
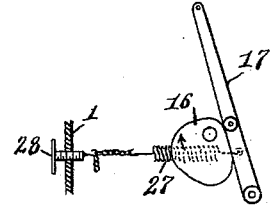
Fig. 2.
Fig. 3.
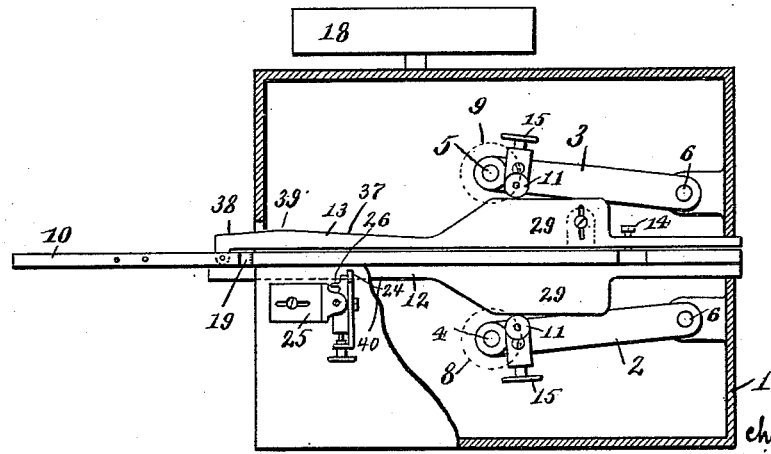
Fig. 4.
Witnesses:
A. C. Rogers
C. Crawford.
Charles Ward Cotton
William C. Margedant
John T. Gardner
August W. G. Margedant
Inventors
by James W. See
Attorney (No Model.) 2 Sheets—Sheet 2.
C. W. COTTON, W. C. MARGEDANT, J. T. GARDNER, & A. W. G. MARGEDANT.
SPOKE FACING MACHINE.
No. 439,053. Patented Oct. 21, 1890.
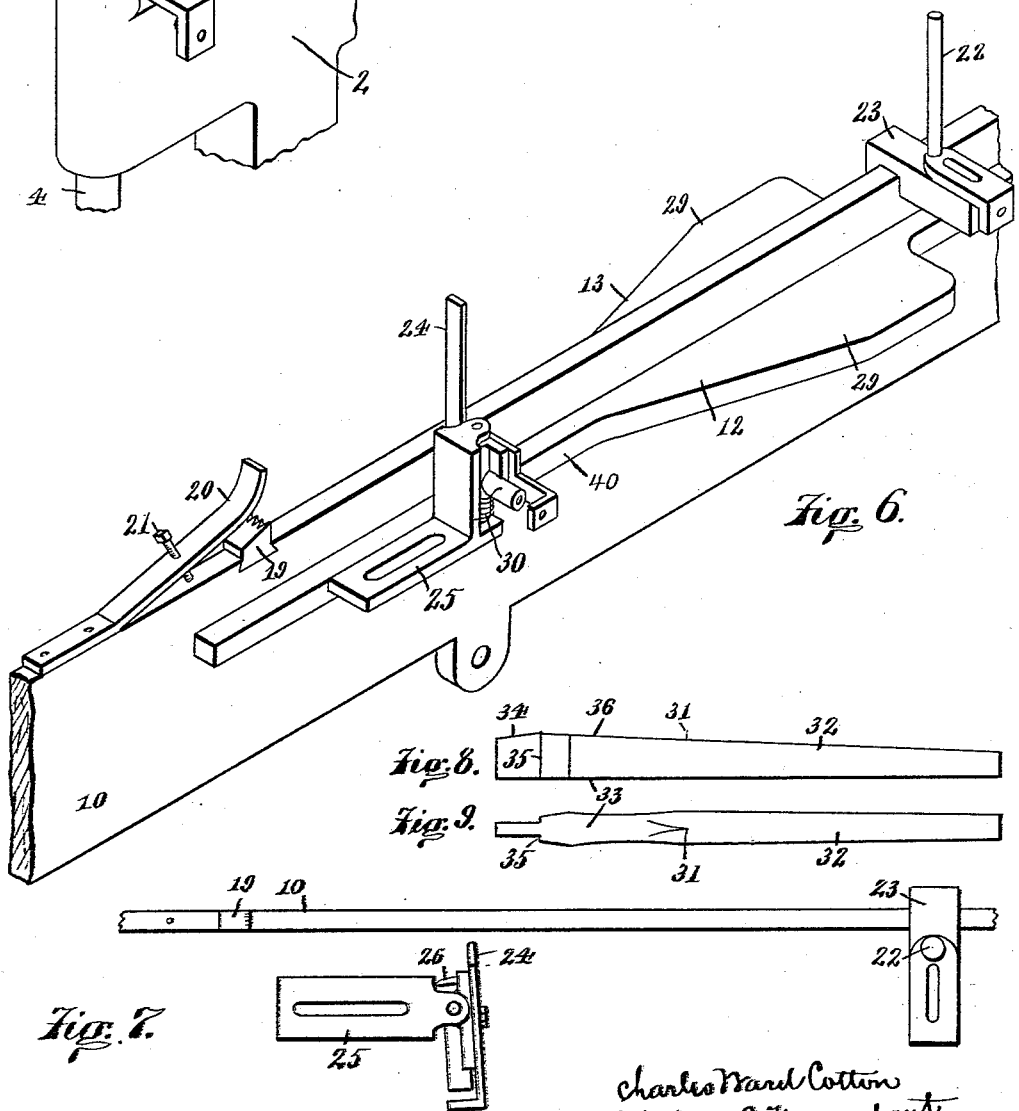
Witnesses:
A. C. Rogers
C. Crawford
Charles Ward Cotton
William C. Margedant
John T. Gardner
August W. G. Margedant
Inventors
by James M. See
Attorney

UNITED STATES PATENT OFFICE.

CHARLES WARD COTTON, OF INDIANAPOLIS, INDIANA, AND WILLIAM C. MARGEDANT, JOHN T. GARDNER, AND AUGUST W. G. MARGEDANT, OF HAMILTON, OHIO, ASSIGNORS TO THE AMERICAN WHEEL COMPANY, OF CHICAGO, ILLINOIS.

SPOKE-FACING MACHINE.

SPECIFICATION forming part of Letters Patent No. 439,053, dated October 21, 1890.

Application filed May 29, 1890. Serial No. 353,527. (No model.)

*To all whom it may concern:*

Be it known that we, CHARLES WARD COTTON, of Indianapolis, Marion county, Indiana, and WILLIAM C. MARGEDANT, JOHN T. GARDNER, and AUGUST W. G. MARGEDANT, of Hamilton, Butler county, Ohio, have invented certain new and useful Improvements in Spoke-Facing Machines, of which the following is a specification.

This invention pertains to machinery for facing spokes after the spokes have been turned and tenoned and preferably throated.

Our improvements will be readily understood from the following description, taken in connection with the accompanying drawings, in which—

Figure 1 is a side elevation of a machine exemplifying our improvements; Fig. 2, a front elevation of the upper part of the frame, (the right of Fig. 1 being considered the front,) showing the ram in endwise view, the cutters, gages, rests, &c., being omitted from this view; Fig. 3, a side elevation, on a smaller scale, of the cam and lever for operating the ram; Fig. 4, a plan of the machine, with the major portion of the top broken away to exhibit the vibrating cutter-housings and the formers which vibrate them, the front rest and the back spring of the ram being omitted from this view; Fig. 5, a perspective view, on an enlarged scale, of the upper rear portion of one of the vibrating cutter-housings, exhibiting its roller for engaging its former; Fig. 6, a perspective view, minus the extreme ends, of the ram and also of the stationary gage; Fig. 7, a plan of the ram and stationary gage, the rear ram-spring being omitted; Fig. 8, a top view of a finished spoke, and Fig. 9 an edge view of the spoke.

The spoke is not drawn to any true proportion, the intention being rather to exaggerate certain features in order that the functions of the machine may be more readily understood.

Referring to Figs. 8 and 9, 31 indicates that point in the length of the spoke where the oval work terminates, the oval work reaching from the small end of the spoke to this point, and there merging into the throating on the sides of the spoke and into the facing on the edges of the spoke; 32, the oval portion of the spoke extending as just indicated; 33, the facing of the spoke on the straight side of the spoke, the same extending from the point 31 to the extreme end of the tenon and lying in a single plane flush with the appropriate oval edge of the spoke; 34, the facing of the tenon on the edge opposite the edge just referred to, this facing being such as to give the tenon a slight taper in its width, so it will drive properly into the mortise of the hub, this taper being very much exaggerated in the drawings in order that it may be more readily appreciated; 35, the shoulder of the tenon at the flat sides of the tenon, and 36 the facing on the spoke upon the edge opposite the edge 33 and extending from the point 31 to the shoulder-point 35, this facing extending in the plane of and flush with the appropriate oval edge of the spoke and terminating at the shoulder end of the tenon-facing 34.

The facing is generally the last cutting done upon the spoke-body. It is important that its surfaces be truly square with the flat faces of the tenon. Therefore the spoke when chucked for facing must be engaged by one of the flat tenon-faces. The facing upon the straight edge of the spoke 23 must be neatly flush with the oval surface on that edge, so as to make neat juncture at point 31. The same must be the case regarding face 36. If spokes were made of metal, the turning would be true with the axial line of the spoke, and if the facing were produced with proper reference to that axial line the desired result of flushness with neat finish could be readily produced by always having reference to the axial line; but spokes are of wood and become distorted. The axial line must therefore be ignored and the facing must be done with reference to the oval-edge surfaces wherever they may be. It therefore becomes essential in chucking the spokes for facing to gage them by the oval surface at point 31 on the straight edge 33, and also by a point on the same edge near the small end of the spoke. If this be done, it will follow that the facing on the straight edge 33 will be in true line and flush with the turned work, giving a flush surface from end to end of the spoke, notwithstanding the spoke may be sprung more or less edgewise in the turned portion of its body. The turning will give a uniform width to the spoke across the point 31, which width will of course not be modified by the springing of the spoke. It follows that facing-cutters adjusted to this width and one of them adjusted to cut flush with the straight edge of the oval work at point 31 the other cutter will be flush with the oval work on the other edge of the spoke. The facing will therefore start right at point 31. The facing upon the straight edge 33 need only be continued in a straight line to the extreme end of the tenon, but the facing upon the other edge of the spoke must diverge in conformity to the general taper of the spoke-body until the shoulder-point be reached, when the facing must converge with reference to the other edge of the tenon, so as to produce the tenon taper. Let it be borne in mind that the straight edge of the spoke is that edge in which the facing is a continuous flat surface. The conditions being now understood, we will proceed with a description of the illustrated machine exemplifying our invention.

In the drawings, 1 indicates the frame of the machine, the same having the general rectangular form with a closed top to protect the lower parts from chips; 2, a vibrating cutter-housing pivoted in the frame and carrying a cutter-head at its rear free portion, the cutter-head being located above the top of the frame; 3, a similar cutter-housing disposed alongside the one first mentioned, the two cutter-housings being disposed at each side of the center of the machine; 4, the cutter-spindle of the first-mentioned cutter-housing, the same being provided with a pulley for a driving-belt; 5, the similar cutter spindle of the second cutter-housing; 6, the vertical pivot-shafts on which the housings oscillate, the same being mounted fixedly in lugs within the frame; 7, springs upon these pivot-shafts, serving to urge the cutter-spindles toward each other; 8, the cutter-head of the first-mentioned cutter-housing, this being the cutter-head which faces the straight edge of the spoke; 9, the opposite cutter-head; 10, a carrier-bar or ram arranged to receive the spoke upon its upper edge and to reciprocate between the cutter-heads, this ram being disposed edgewise vertically and having a thickness not greater than the least width of facing to be produced; 11, a roller mounted adjustably upon each cutter-housing and arranged to bear against formers carried by the sides of the ram; 12, a former secured permanently against one face of the ram and bearing against roller pertaining to cutter-head 8, the contour of this former being such as during the reciprocation of the ram to permit the cutter-head 8 to occupy the proper facing position when performing its facing duty and to move that cutter-head far away from the spoke at the time when the spoke is to be inserted in the carrier; 13, a similar former upon the opposite side of the ram and engaging the roller pertaining to cutter-head 9, this former, however, being pivoted at its rear end to the ram and provided forwardly with an adjusting-screw, so that the former may have its edge adjusted to and from the ram; 14, the adjusting-screw screwing through the former 13 and against the face of the ram and serving to adjust this former; 15, hand-screws for adjusting the rollers 11 inwardly and outwardly from the cutter-spindles so that the relation of the cutter-circles may be altered with relation to the edges of the formers; 16, a cam mounted on a shaft in the lower portion of the frame, this cam having a general lobe shape; 17, a lever bearing against this cam and pivoted at its lower end to the frame and attached at its upper end by a link to the ram, the arrangement being obviously such that the rotation of the cam produces reciprocations of the ram, the length of reciprocations being very much in excess of the length of facing to be produced; 18, a driving-pulley, having its shaft geared to the shaft of the cam and serving as means by which a driving-belt may be employed in reciprocating the ram; 19, a tenon-rest projecting upwardly from the edge of the ram and having a sharp and preferably serrated edge whose horizontal plane is at right angles to the axis of the cutter-heads, the width of this rest being less than the least width of spoke-tenon to be dealt with; 20, a narrow spring secured at its rear end to the upper edge of the ram and projecting forwardly over the tenon-rest 19, the forward end of this spring curving freely upward; 21, an adjusting-screw in the spring by means of which the spring can be raised or lowered so as to alter the normal distance between the spring and the tenon-rest; 22, a gage-pin, hereinafter termed the "body-gage," projecting up from the edge of the ram, near the forward end of the ram, and arranged to be adjusted sidewise with reference to the ram, the office of this gage being to engage the oval edge of the spoke-body upon the straight edge of the spoke, near the small end of the spoke; 23, a rest, hereinafter termed the "body-rest," projecting up from the edge of the ram at the foot of the body-gage and carrying the body-gage, the body of the spoke near its small end thus being supported by the body-rest and gaged upon its straight edge by the body-gage; 24, a gage, hereinafter termed the "flush-gage," projecting up from the top of the frame alongside the ram, upon the same side with the body-gage, this flush-gage being also adjustable to and from the ram and being also adjustable forward and back upon the frame, the intention being that when the ram is clear back and a spoke held thereby with its tenon-shoulder against the front face of the tenon-rest 19 the flush-gage 24 shall bear against the spoke at the rear terminal 31 of the oval turning of the spoke on the straight edge of the spoke; 25, the adjustable housing which carries the flush-gage 24, the flush-gage being pivoted in this housing so that it may swing away from the spoke as the spoke makes its forward stroke; 26, a stop upon the flush-gage to determine the returning position of the flush-gage after it has swung back; 27, a spring attached to the cam-lever 17 and serving to produce the return-stroke of the lever; 28, an adjusting-screw for adjusting the tension of this spring, this screw preferably engaging the spring through the medium of chain-links, to which it is hooked, so that a short screw may give great length of adjustment by hooking into selected links; 29, the expanded or broad portions of the formers, these portions producing the wide-open condition of the cutter-heads; 30, a spring upon the flush-gage 24, serving to hold that gage to its normal gage position as limited by stop 26, this spring permitting the gage to fall away from the spoke, as before mentioned; 31, 32, 33, 34, 35, and 36, spoke features, heretofore fully referred to; 37 that portion of the contour of former 13 which extends rearwardly from the swell of the former to the point corresponding with the tenon-shoulder of the spoke, this portion of the former being upon a taper corresponding with the general taper of the taper edge of the spoke and producing the portion 36 of the spoke-facing; 38 that portion of the same former at the rear end of the former extending on a taper from the rearward termination of portion 37 to the end of the former and producing the facing 34 on the tapering edge of the spoke-tenon; 39 that point in this former where the two portions 37 and 38 join, that point corresponding with the point where portions 34 and 36 of the spoke-facing join, and 40 that portion of the former 12 which extends rearwardly from the swell of the former to its rear end, this portion of this former being a straight line parallel with the movement of the ram.

In Fig. 1 the ram is clear back, and the cutter-heads are widely separated, and all is in condition to receive a spoke, and it is desirable that the cam 16 be so formed with a concentric portion as to give an interval of rest to the ram while the spoke is being chucked.

The spring 20 is to be so adjusted that there will be plenty of room to poke the end of the spoke-tenon in under the spring and over the tenon-rest 19. During the insertion the forward end of the spoke is elevated, and after the spoke is pushed endwise, so that the tenon shoulder comes against the tenon-rest, its front end is depressed down upon the body-rest 23. This causes the upper rear corner of the tenon to engage under the spring and lift the spring, which thus clamps the tenon down upon the tenon-rest. By this construction of tenon-clamp a free throat is provided in conjunction with a firm clamping. When the spoke is to be inserted, the first act is to slap it sidewise against the gages 24 and 22, and the extreme height of these gages permits this to be done while the spoke is in its inclined position of presentation. When the spoke is edgewise against these gages, it is then poked endwise to the tenon-shoulder and its front end depressed, as before explained. This leaves the spoke chucked by the ram and square with the spoke-tenon and so gaged on its straight oval edge at two points that the straight oval edge of the spoke will be parallel with the ram movement. The two gages 22 and 24 are to be adjusted to bring this edge of the spoke parallel with the ram, and the roller of cutter-head 8 is to be so adjusted that the cutting will be flush with the point of the spoke touched by the flush-gage 24. Under such conditions it will be seen that as the ram moves forward the rough straight face of the spoke will push the flush-gage 24 aside, and that the cutter-head 8 will move inwardly and face the spoke upon its straight edge in true line with the oval work on the straight edge of the spoke; but at the same time the other edge of the spoke is faced. The roller of cutter-head 9 is to be so adjusted that the cutter-head when it starts the facing will work flush with the oval work, this adjustment corresponding with the width of the turning at the point gaged by the flush-gage 24. During the axial facing there is no disturbance of the position of cutter-head 8, but cutter-head 9 is properly moved outward by portion 37 of its former, and then moves inwardly again at portion 38 to produce the drive of the tenon. Former 13 may be adjusted by means of its screw 14, so that portion 37 corresponds with the general taper of the spoke. If the machine works on uniform work—that is, always on one kind of spokes—then, of course, this adjustment will not be needed, and the same may be said about the adjustment of the gages, these adjustments being provided for the purpose of enabling the machine to operate upon different kinds of spokes. The facing is preferably performed while the ram is making its forward stroke, the operator's hand meanwhile holding down the front end of the spoke. Upon the completion of the forward stroke, or later, if desired, the front end of the spoke is raised and withdrawn, and then the new spoke is inserted, as has been described. The facing may of course, if desired, be done during the back-stroke, the spoke being inserted at the end of the forward stroke; but the manner before described will be found productive of smoother work.

We claim as our invention—

1. In a spoke-facing machine, the combination, substantially as set forth, with a pair of vibrating cutter-heads, of a reciprocating ram provided with a tenon-rest and a body-rest for the spoke, formers carried by the ram and serving to vibrate the cutter-heads, a body-gage for the spoke carried by the ram at the body-rest, a tenon-clamp carried by the ram at the tenon-rest, and a yielding flush-gage on the frame at the side of the ram.

2. In a spoke-facing machine, the combination, substantially as set forth, with a reciprocating ram, vibrating cutter-heads, formers to vibrate the cutter-heads, and gages to gage the spoke, of a tenon-rest carried by the ram and a spring disposed over the tenon-rest and curving upwardly therefrom and serving to engage the end of a spoke-tenon supported by said tenon-rest.

3. In a spoke-facing machine, the combination, substantially as set forth, with a pair of vibrating cutter-heads, a ram, and rests and gages for a spoke, of a former carried by that side of the ram corresponding with the straight side of the spoke and a former adjustably pivoted at the other side of the ram and having in its contour two tapering portions joining at a point corresponding with the tenon-shoulder point of the spoke.

4. In a spoke-facing machine, the combination, substantially as set forth, with a pair of vibrating cutter-heads, a reciprocating ram, and formers carried by the ram, of a tenon rest and clamp carried by the ram, a body-rest and body-gage carried by the ram, and a yielding flush-gage supported by the frame of the machine alongside the ram.

5. In a spoke-facing machine, the combination, substantially as set forth, of a frame having a closed top, a pair of vibrating cutter-heads above the same, a ram-bar set vertically edgewise between the cutter-heads, rests, gages, and formers carried by the ram-bar, a pivoted flush-gage supported by the top of the frame, vibrating cutter-housing within the frame, and mechanism within the frame for reciprocating the ram-bar.

CHARLES WARD COTTON.
WM. C. MARGEDANT.
JOHN T. GARDNER.
AUGUST W. G. MARGEDANT.

Witnesses:
A. C. ROGERS,
J. W. SEE.